(12) United States Patent
Dann (10) Patent No.: US 9,990,240 B2
(45) Date of Patent: Jun. 5, 2018

(54) EVENT HANDLING IN A CLOUD DATA CENTER

(71) Applicant: SuccessFactors, Inc., South San Francisco, CA (US)

(72) Inventor: Wilko Dann, Ketsch (DE)

(73) Assignee: SuccessFactors, Inc., South San Francisco, CA (US)

( * ) Notice: Subject to any disclaimer, the term of this patent is extended or adjusted under 35 U.S.C. 154(b) by 82 days.

(21) Appl. No.: 14/966,235

(22) Filed: Dec. 11, 2015

(65) Prior Publication Data

US 2017/0168879 A1    Jun. 15, 2017

(51) Int. Cl.
*G06F 9/54* (2006.01)
*G06F 9/50* (2006.01)

(52) U.S. Cl.
CPC ............ *G06F 9/542* (2013.01); *G06F 9/5083* (2013.01)

(58) Field of Classification Search
CPC ... G06F 9/54; G06F 9/50; G06F 9/542; G06F 9/5083
See application file for complete search history.

(56) References Cited

U.S. PATENT DOCUMENTS

| | | | | |
|---|---|---|---|---|
| 5,081,572 A | * | 1/1992 | Arnold | G06F 9/52 711/163 |
| 2004/0090974 A1 | * | 5/2004 | Balakrishnan | H04L 47/10 370/412 |
| 2006/0230077 A1 | * | 10/2006 | Satou | G06F 9/5027 |
| 2009/0070786 A1 | * | 3/2009 | Alves et al. | G06F 9/541 719/318 |
| 2012/0023499 A1 | * | 1/2012 | Biran | G06F 9/5066 718/103 |
| 2013/0024875 A1 | * | 1/2013 | Wang | G06F 9/542 719/318 |
| 2013/0179942 A1 | * | 7/2013 | Caplis | H04L 67/28 726/3 |
| 2016/0034843 A1 | * | 2/2016 | Costello et al. | G06Q 10/063114 705/7.15 |
| 2016/0034872 A1 | * | 2/2016 | Hendrick | G06Q 20/20 705/16 |

* cited by examiner

*Primary Examiner* — Umut Onat
(74) *Attorney, Agent, or Firm* — Fountainhead Law Group P.C.

(57) ABSTRACT

Disclosed is event processing a computing center, which may include receiving events from users of the computing center to be processed. Each received event may be stored in an event queue that is associated with a customer of the user. Events in an event queue may then be processed by an event processor that is associated with that event queue.

20 Claims, 7 Drawing Sheets

EVENT HANDLING IN A CLOUD DATA CENTER

BACKGROUND

In cloud data centers, there is often the challenge of finding a good balance between the costs of operation and offering services to customers in a way that the customers expect. Therefore, it is usual to setup some services in a data center as a shared service. Typical use case are services for asynchronous processing such as an event server or job servers. Such servers may use queues that act on the FIFO (first in first out) principle. For some use cases, this behavior may be sufficient. However, in a data center environment situations often arise that are more demanding.

Consider the following situation. Suppose a data center has 100 customers. Of those customers, suppose in a given instance that 70 customers are using the data center with average loading on the data center, 25 customers are not using the data center much, and 5 customers happen to be preloading the system with data, for example, because they will be coming on-line soon. The preload activities typically occur asynchronously and so they can fill up the queue of the event server. If these asynchronous tasks have also long processing times, this can lead to a situation where the simpler asynchronous tasks of the other customers may be unacceptably delayed before being processed.

SUMMARY

Aspects in accordance with the present disclosure may include a method in a computing center may include receiving events from users to be processed. For each received event, a customer associated with the user may be identified. The customer may be used to identify an event queue, and the received event may be enqueued on that event queue. The method may include dequeuing an event from the event queue and sending the dequeued event to an event processor that is associated with the event queue to be processed.

In some aspects, the method may further include concurrently dequeuing events from the plurality of event queues.

In some aspects, each event queue in the plurality of event queues may be associated with a priority. The method may further include dequeuing events from the plurality of event queues in order of the priorities associated with the plurality of event queues.

In some aspects, the method may further include comprising dequeuing events from an event queue in first-in first-out fashion.

In some aspects, each event in an event queue may be associated with a priority.

The method may further include dequeuing events from an event queue in order of the priorities associated with the events.

In some aspects, the method may further include adding a new customer to the computing center, including: creating an event queue that is associated with the new customer and adding the created event queue to the plurality of event queues.

In some aspects, the method may further include receiving a request to delete an existing customer from the computing center, and in response thereto, removing from the plurality of event queues an event queue that is associated with the existing customer.

Aspects in accordance with the present disclosure may include a computer center comprising a plurality of computer processors. The computer processors my be configured to receive events from users of the computing center. For each received event, a customer associated with the user may be identified. The customer may be used to identify an event queue, and the received event may be enqueued on that event queue. The method may include dequeuing an event from the event queue and sending the dequeued event to an event processor that is associated with the event queue to be processed.

In some aspects, the computer processors may be further configured to concurrently dequeue events from the plurality of event queues.

In some aspects, the computer processors may be further configured to dequeue events from an event queue in first-in first-out fashion.

In some aspects, each event in an event queue may be associated with a priority, the computer processors may be further configured to dequeue events from an event queue in order of the priorities associated with the events.

In some aspects, the computer processors may be further configured to add a new customer to the computing center, including: creating an event queue that is associated with the new customer and adding the created event queue to the plurality of event queues.

In some aspects, the computer processors may be further configured to to receive a request to delete an existing customer from the computing center, and in response thereto, remove from the plurality of event queues an event queue that is associated with the existing customer.

In some aspects, the computing center may be a cloud data center.

Aspects in accordance with the present disclosure may include non-transitory computer readable media in a computing center having executable computer instructions stored thereon. Execution of the computer instructions by a computer system may cause the computer system to receive events from users of the computing center. For each received event, a customer associated with the user may be identified. The customer may be used to identify an event queue, and the received event may be enqueued on that event queue. The computer system may dequeue an event from the event queue and send the dequeued event to an event processor that is associated with the event queue to be processed.

In some aspects, the computer system may concurrently dequeue events from the plurality of event queues.

In some aspects, each event queue in the plurality of event queues is associated with a priority. The computer system may further dequeue events from the plurality of event queues in order of the priorities associated with the plurality of event queues.

In some aspects, each event in an event queue is associated with a priority. The computer system may further cause the computer system to dequeue events from an event queue in order of the priorities associated with the events.

In some aspects, the computer system may add a new customer to the computing center, including: creating an event queue that is associated with the new customer and adding the created event queue to the plurality of event queues.

In some aspects, the computer system may receive a request to delete an existing customer from the computing center, and in response thereto, remove from the plurality of event queues an event queue that is associated with the existing customer.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
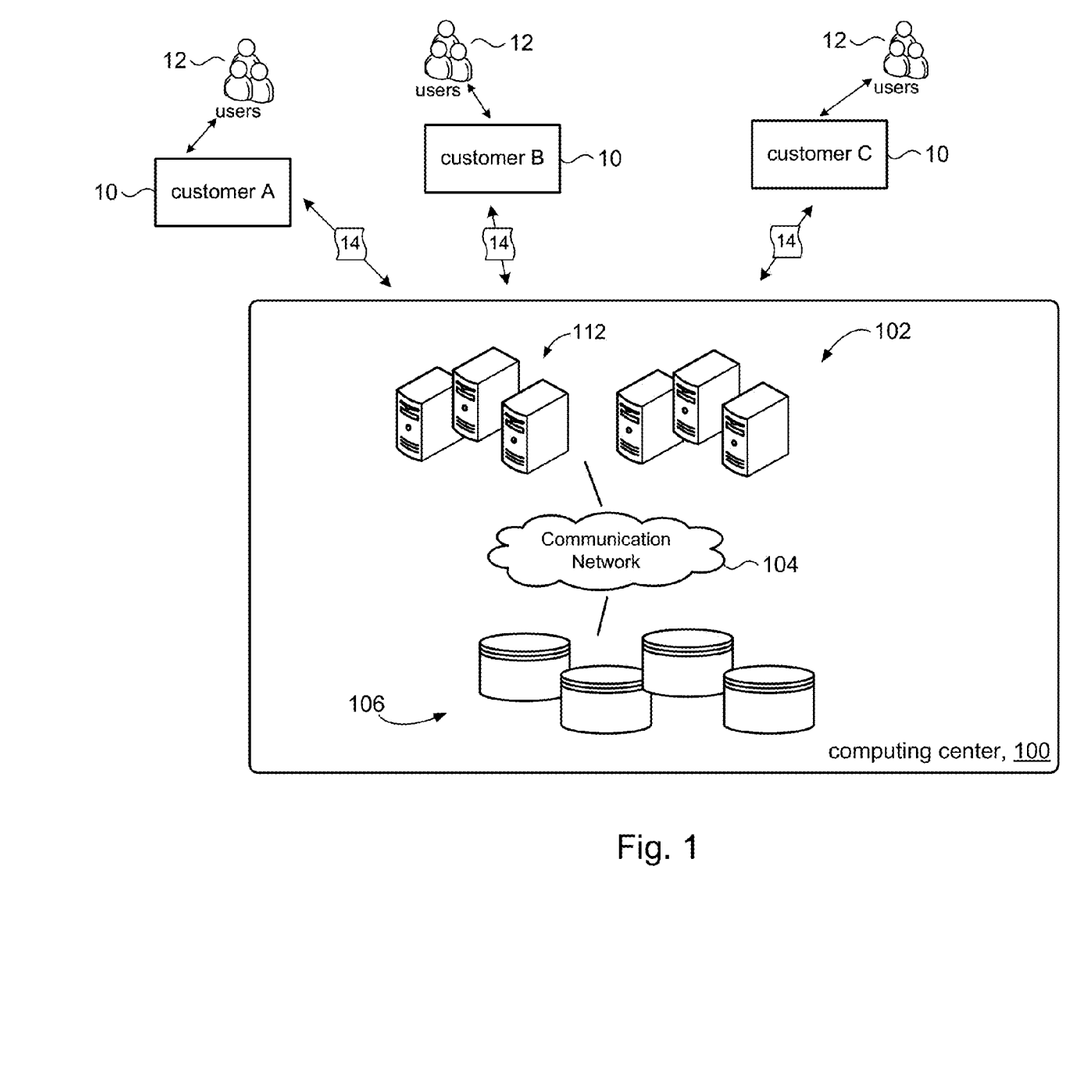
FIG. 1 shows a computing center that incorporates an event server in accordance with the present disclosure.

FIG. 1 shows a computing center 100 that can incorporate an event server 112 in accordance with the present disclosure. In some embodiments, the computing center 100 may provide various kinds of computing resources as services. For example, the computing center 100 may provide software as a service (SaaS). The computing center 100 may host applications that can be made available to customers 10 over a suitable network, such as the Internet. The computing center 100 may operated to provide cloud storage services to maintain and manage customers' data, and making that data accessible to the customers 10 over a suitable network. The computing center 100 may operate a cloud data center, comprising on-site servers configured with related applications that are built with consistent infrastructure components (such as racks, hardware, OS, networking, and so on) to provide specific services. Merely as an example, the cloud data center may provide a human resources (HR) solution to meet the HR needs of its customers 10.

The computing center 100 may include infrastructure and technology to partition its computing resources (e.g., processing capability, networking, storage, etc.) so that each customer 10 sees its own computing environment. For example, users 12 of customer A will have access only to the computing resources allocated to customer A, and not to the computing resources allocated to other customers 10.

The computing center 100 may include computer systems 102. In some embodiments, the computer systems 102 may support process threads, virtual machines, and other similar functionality, referred to collectively as software processing elements. In some embodiments, the computing center 100 may allocate and de-allocate software processing elements to a customer 10 (e.g., customer A) in real-time as the processing needs of the customer 10 varies. In other embodiments, the computing center 100 may allocate a fixed number of software processing elements to a customer 10. In accordance with the present disclosure, one or more of the computer servers 102 may be configured to instantiate or otherwise provide event server 112. As will be explained in more detail, event server 112 may be configured to service event requests 14 from users 12.

The computing center 100 may include a storage system 106 to support the storage needs of the customers 10. A communications network 104 can provide data communication between the computer systems 102 and the storage system 106.

Figure 2:
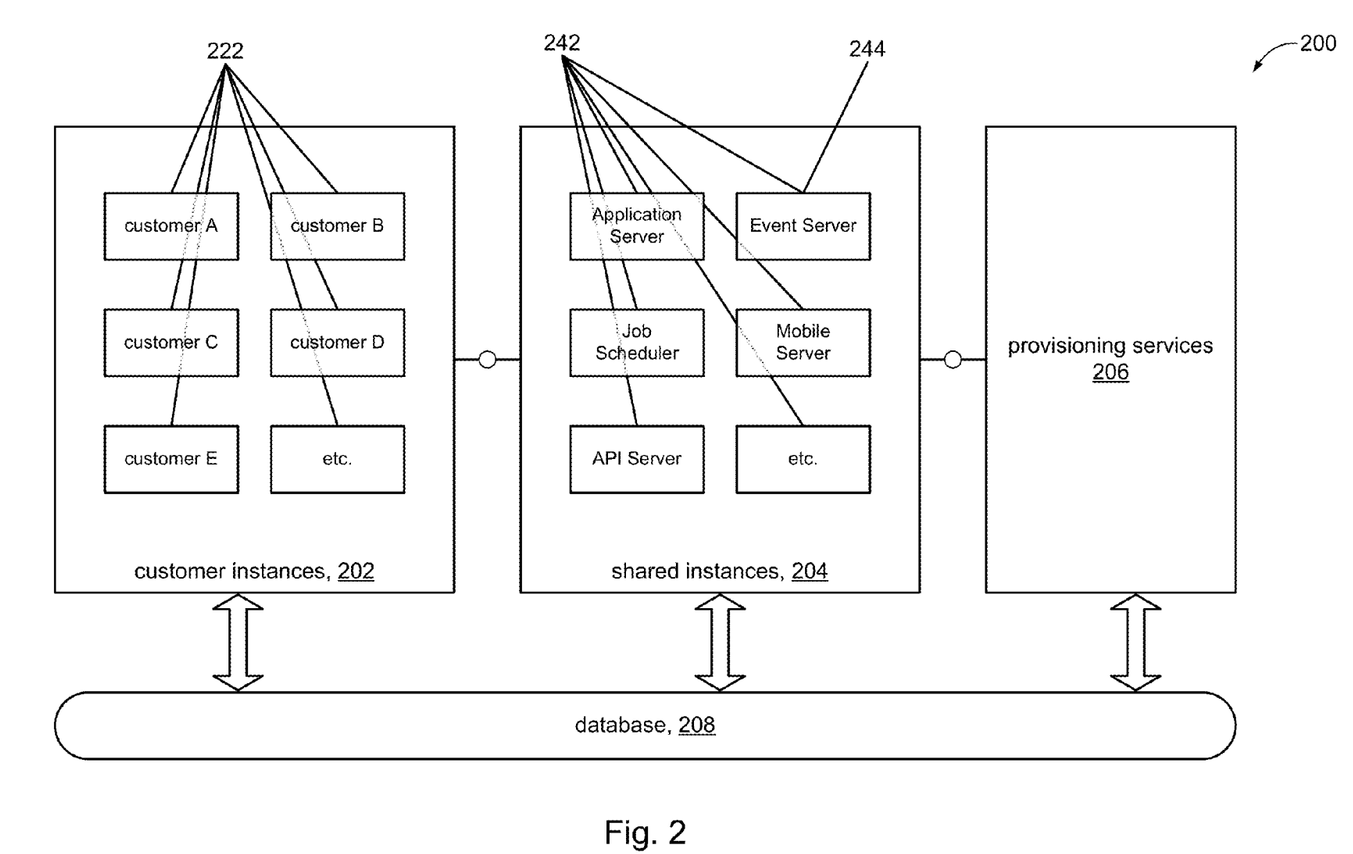
FIG. 2 show an example of a computing center that incorporates an event server in accordance with the present disclosure.

FIG. 2 shows an illustrative embodiment of a computing center in accordance with the present disclosure. In particular, the computing center shown FIG. 2 represents an example of a cloud data center 200. The computer systems (e.g., 102, FIG. 1) that comprise the cloud data center 200 may be organized to provide a cluster 202 of customer instances. A customer instance 222 represents computing resources of the cloud data center 200 allocated to a given customer (e.g., 10, FIG. 1). For example, each customer instance 222 may comprise one or more software processing elements (e.g., instantiated virtual machines assigned or otherwise associated with respective customers). Each customer instance 222 constitutes a computing environment for a given customer (e.g., customer A, FIG. 1) that is accessible only by that customer, and not accessible by other customers. The configuration of the computing environment (e.g., processing capacity, storage, network bandwidth, etc.) may vary from one customer to another.

The computer systems (e.g., 102, FIG. 1) that comprise the cloud data center 200 may be further organized to include a cluster 204 of shared instances. As the name suggests, each shared instance 242 may be accessed by the customer instances 222, for example, to perform or initiate various services, such as configuring applications (Application Sever), setting up and running batch jobs (Job Scheduler), interfacing with users on mobile devices (Mobile server), and so on. An Event Server 244 in accordance with the present disclosure may be used to run asynchronous tasks needed by users (e.g., 12, FIG. 1) of customers of the cloud data center 200.

The cloud data center 200 may include a provisioning services module 206. In some embodiments, the provisioning services module 206 may configure a computing environment for a given customer (e.g., defines a customer instance 222). For example, the provisioning services module 206 may configure and instantiate software processing elements (e.g., virtual machines) for a customer, from among the computer systems (e.g., 102, FIG. 1) that comprise the cloud data center 200. The provisioning services module 206 may configure networking resources for the given customer, data storage resources for the given customer, and so on.

The storage system (e.g., 106, FIG. 1) that comprises the cloud data center 200 may include a database subsystem 208. The provisioning services module 206 may define and configure one or more database instances for a given customer. The database subsystem 208 may be accessible by the shared instances cluster 204, for example, to instantiate various data structures that a particular shared instance 242 may need to perform its tasks. As will be discussed below, for example, the Event Sever 244 may instantiate certain data structures in accordance with the present disclosure.

Figure 3:
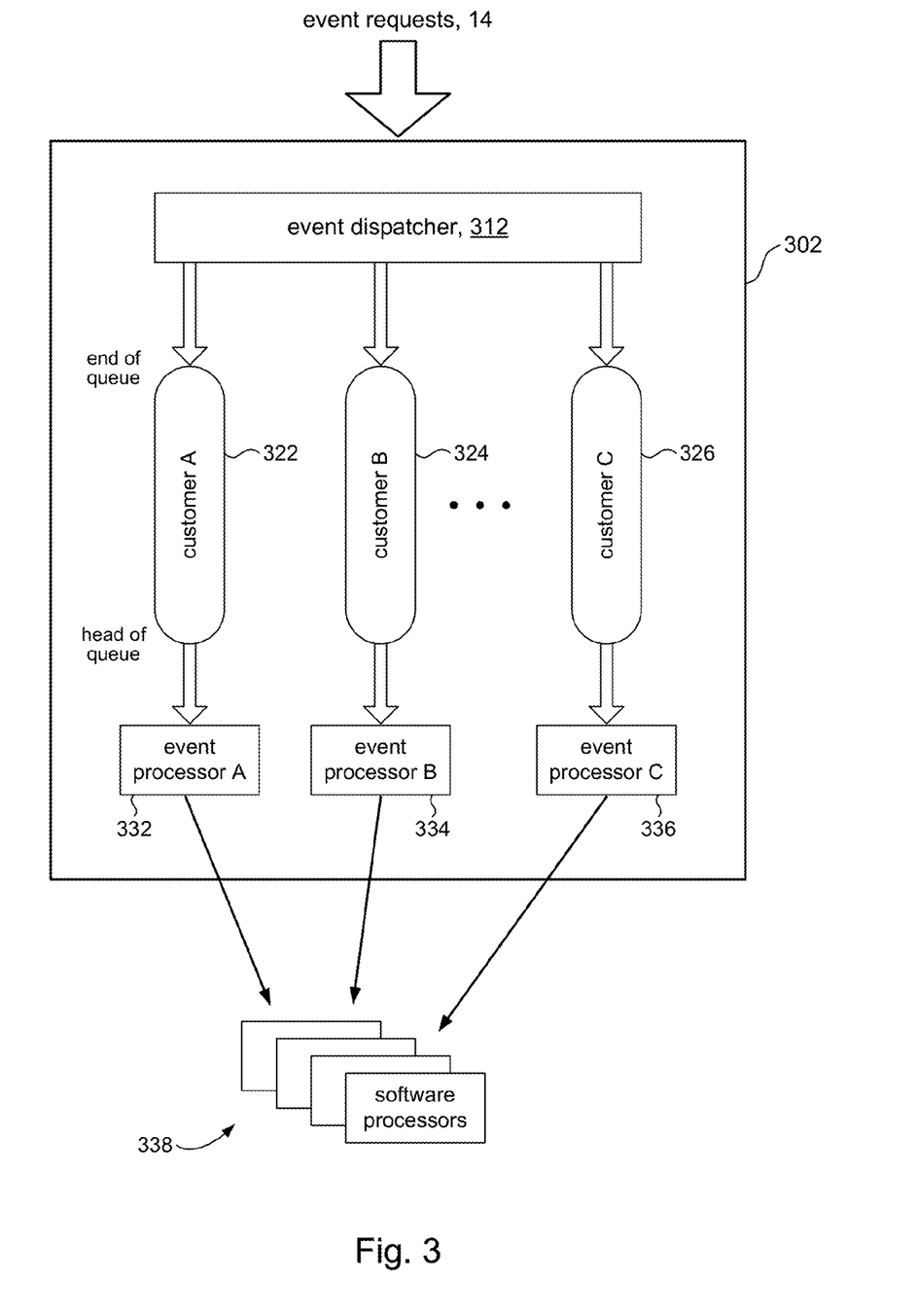
FIG. 3 shows details of an event server in accordance with aspects of the present disclosure.

FIG. 3 shows a logical view of an event server 302 in accordance with the present disclosure that may be instantiated in a computing center (e.g., 100, FIG. 1). A specific example of event server 302 was described as Event Server 244 instantiated in the cloud data center 200 in FIG. 2. As used herein, an "event" may refer to an asynchronous task that a user 12 of a customer 10 may request the computing center to perform. Events can range from relatively small/simple tasks, such as sending out meeting notices to other users 12 to relatively large and time consuming tasks such as a data mining analysis or loading data into a database.

The event server 302 may include an event dispatcher 312. The event dispatcher 312 may receive event requests 14 from users of the customers in the computing center. The event server 302 may further include several event queues 322, 324, 326. In some embodiments, for example, the event queues 322-326 may be instantiated from the storage system (e.g., 106, FIG. 1) that comprises the computing center. In accordance with the present disclosure, each customer may be associated with an event queue 322-326. For example, customer A (FIG. 1) may be associated with event queue 322, customer B may be associated with event queue 324, customer C may be associated with event queue 326, and so on.

Further in accordance with the present disclosure, each event queue 322-326 may be associated with a respective event processor 332, 334, 336. In some embodiments, the event processors 332-336 may be software processing elements (e.g., virtual machines) instantiated in the computer systems (e.g., 102, FIG. 1) of the computing center. The event processors 332-336 may invoke additional software processing elements 338; using the provisioning services module 206 (FIG. 2), for example.

Figure 4:
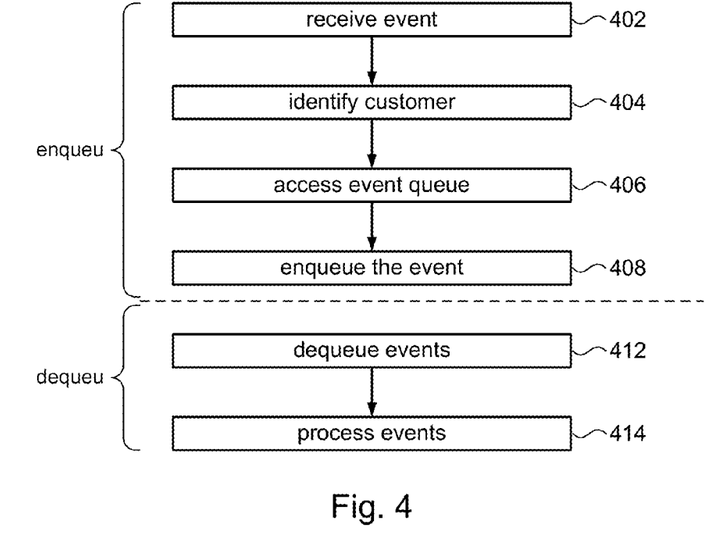
FIGS. 4, 5, and 6 illustrate processing in accordance with the present disclosure.

FIG. 4 shows processing in an event server (e.g., 244, FIG. 2) of a computing center (e.g., cloud data center 200) to process event requests (e.g., 14, FIG. 1) in accordance with the present disclosure. When a user has a task to perform (e.g., send a push notification to mobile users, load data into a database, etc.), the user may send an event request to the computing center, for example to the event server, to have the task performed.

Accordingly, at block 402, the event server may receive the event request. The event request may include information that identifies the task to be performed. The event request may include information that identifies data or a source of data that may be needed to perform the task. The event request may identify a recipient of data produced by the task; e.g., recipients of a message to be sent, a location(s) to store data, and so on.

At block 404, the event server may identify the customer that the user who sent the event request is associated with. In some embodiments, for example, the event request may include information (user ID) that identifies the user who sent the event request. The event server may map the user ID to information (customer ID) that identifies the customer associated with the user. In other embodiments, the event request may include the customer ID. In general, the event request may include information of some kind that can be used to determine the customer ID.

At block 406, the customer ID may be used to identify the event queue (e.g., 322-326, FIG. 3) that corresponds to the customer identified by the customer ID. As explained above, each customer has their own corresponding event queue. By associating each customer with their own event queue, the computing center need only deploy a single shared event server to service event requests for all its customers. Having a single shared event server may be beneficial in that the computing center need not deploy a new event server each time a customer is added to the computing center, which could otherwise add to the operating cost of the computer center. Having individual event queues for customers, avoids the possibility of any one customer from tying up the event server at the expense of the other customers.

At block 408, the event request may be enqueued on the event queue corresponding to the customer ID associated with the event request. In some embodiments, each event queue may be a first-in-first-out (FIFO) queue. In such a queue, each event may be considered equal in priority, and event requests may be processed on a first come, first served basis. Accordingly, a received event request may be placed at the end of the event queue, while event requests are taken from the head of the event queue, one at a time, for processing.

In other embodiments, each event queue may be a priority queue in which events in the queue are prioritized. Accordingly, some events in the queue may be deemed to be higher in priority than other events in the same queue. For example, a push notification for a software update may be deemed to be a more important event (and hence higher in priority) than an out-of-office notification. Accordingly, a received event request having a given priority may be inserted in the event queue ahead of other received events of lower priority. Events of equal priority may be processed in FIFO order. In still other embodiments, customers may have different types of event queues. For example, customer A may have a FIFO queue, customer B may want a priority queue, and so on.

Blocks 402-408 in FIG. 4 relate to enqueuing event requests. The discussion will now turn to processing in the event server to dequeue event requests. Recall from FIG. 3, in some embodiments, each event queue 322-326 may be associated with a corresponding event processor 332-336. Each event processor 332-336 may process event requests in its associated event queue 322-326.

Accordingly, at 412, an event request in an event queue (e.g., 322) may be "popped" off or removed (dequeued) from the event queue.

At 414, the event request may be sent to an event processor (e.g., 332) that corresponds to the event queue, to process the task specified the event request. The event request may include information that identifies the task to be performed. Depending on the computational requirements of the task, the event processor itself may perform the task. For example, the event processor may spawn one or more processing threads to process a request that has low computational requirements. On the other hand, the event processor may instantiate one or more additional software processing elements (e.g., 338, FIG. 3) to perform a task that is more computationally intense. For example, a data intensive and time consuming operation on a large database may be performed on a software processing element other than the event processor. Thus, instead of tying up the event processor to handle large tasks, the event processor can be freed up to continue processing other event requests from the event queue.

The dequeuing process described above may be performed for each event queue that is managed by the event processor associated with that event queue. In some embodiments, the event queues may be concurrently processed, since each event queue has its own event processor that may operate independently of other event processors. In other words, the event queues are not prioritized in terms of accessing the computer resources of the computing center (e.g., cloud computing center 200, FIG. 2).

In other embodiments, the computing center may give customers different priorities for accessing the computing resources of the computing center. Accordingly, the event queues themselves may be prioritized. The event processors may be coordinated so that event queues are processed in order of priority of the queues. For example, an event request in an event queue with the highest priority might be processed before event requests in lower priority event queues. Event queues that have equal priority may be processed concurrently. Prioritizing event queues allows, for example, for customers who are testing their installations to run with lower priority and allocation resources than customers who have production systems. Prioritizing event queues can support a business model in which customers can subscribe to get extra performance from the computing center.

Figure 5:
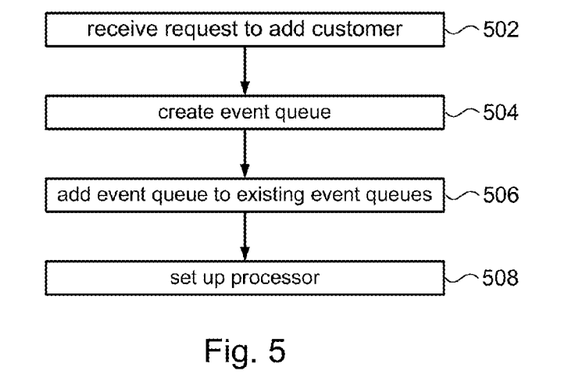

FIG. 5 shows processing in an event server (e.g., 302, FIG. 3) to process a new customer in accordance with the present disclosure. At block 502, the event server may receive a request to register or otherwise create a new customer. The request may include information (e.g., customer ID) that identifies the customer. At block 504, the event server may instantiate or otherwise allocate space (e.g., in a database) for a new event queue. The new customer may be associated with the new event queue, using for example, the customer ID of the new customer. At block 506, the new event queue may be added to the list of existing event queues. At block 508, the event server may instantiate an event processor to process the new event queue.

Figure 6:
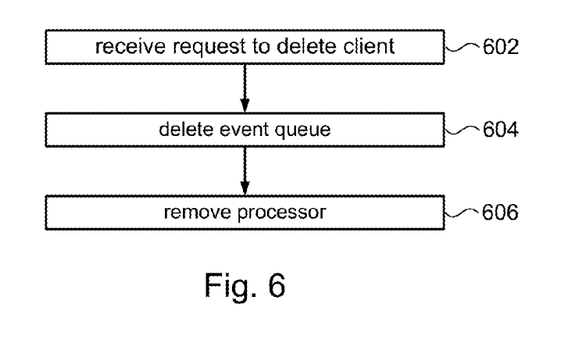

FIG. 6 shows processing in an event server (e.g., 302, FIG. 3) to delete an existing customer in accordance with the present disclosure. At block 602, the event server may receive a request to de-register or otherwise delete an existing customer. At block 604, the event server may de-allocate the event queue associated with the customer to be deleted. At block 606, the event server may de-allocate, shut down, or otherwise delete the event processor associated with the customer to be deleted. The data for that customer may be retained according to applicable corporate or governmental data retention policies or requirements.

Figure 7:
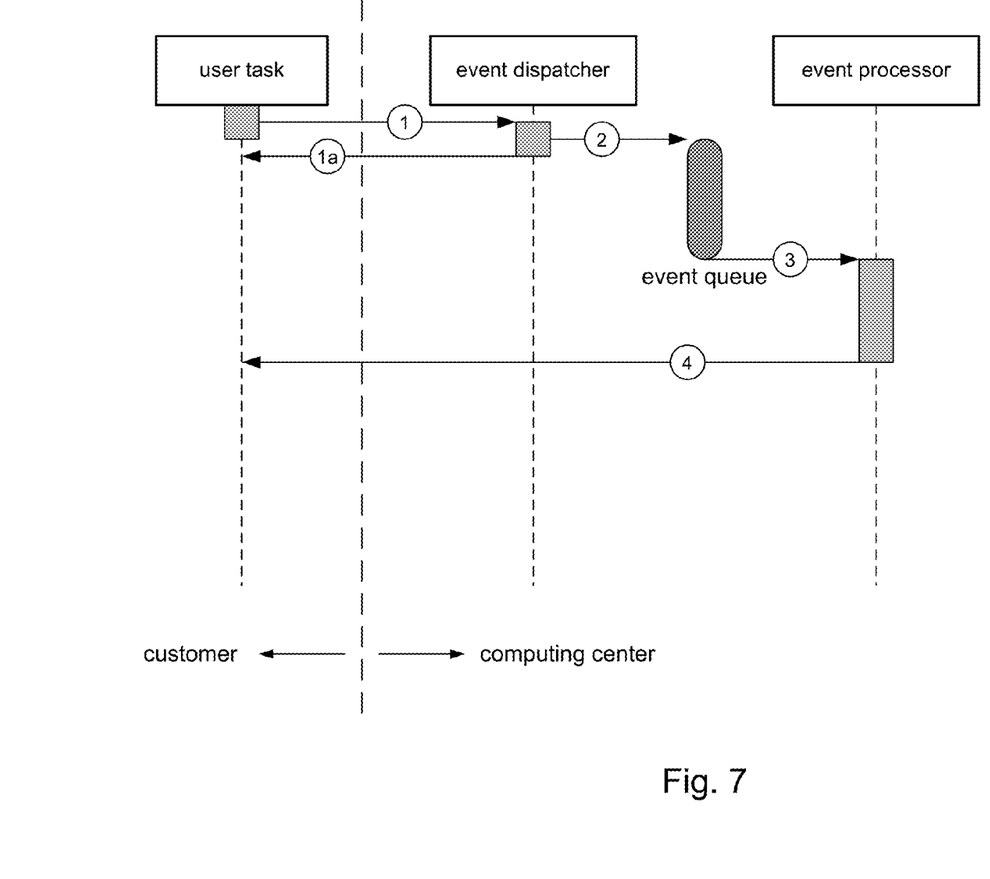
FIGS. 7 and 7A illustrate communication sequence diagrams in accordance with aspects of the present disclosure.

FIG. 7 illustrates a communication diagram between a customer (e.g., via a user) and a computing center (e.g., 100, FIG. 1, cloud data center 200, FIG. 2) in accordance with the present disclosure. A user at a customer may send (1) an event request to the event dispatcher. In some embodiments, the event dispatcher may send (1a) an acknowledgment to the user to acknowledge the event request. The event dispatcher may enqueue (2) the event request on the event queue that corresponds to the customer associated with the user. An event processor corresponding to the event queue may pick up (3) event requests from the event queue and perform the task that is requested in the event request. The event processor may notify (4) the user when the task is complete.

Figure 7A:
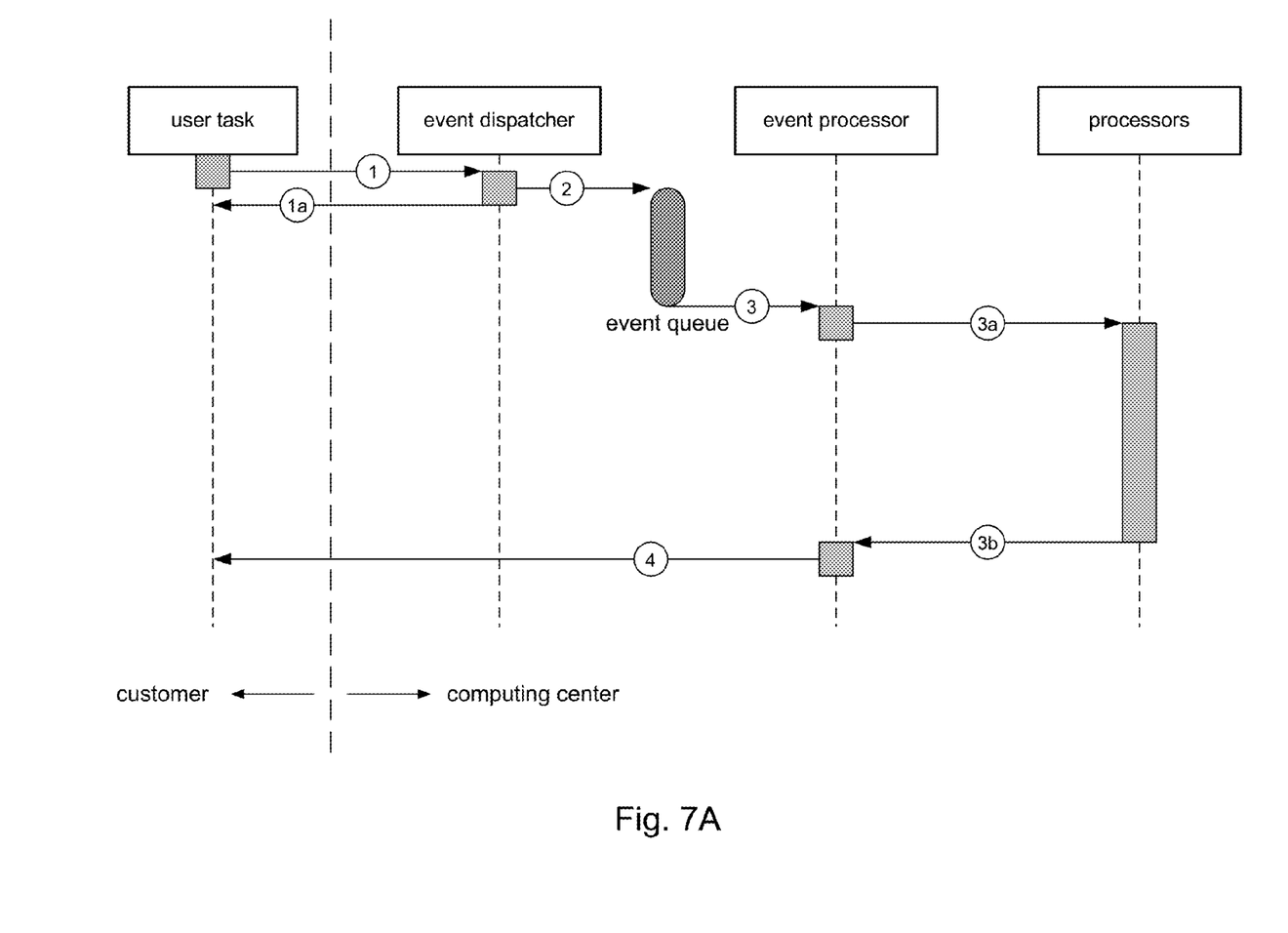

FIG. 7A illustrates a variation in which the event processor may forward (3a) the task to another processor (or processors). For example, the task may be deemed large enough that another processor may more efficiently handle the task. The additional processor may notify (3a) the event processor when the task is complete, which may then notify (4) the user. Alternatively, the additional processor may directly notify (not shown) the user when the task is complete.

Figure 8:
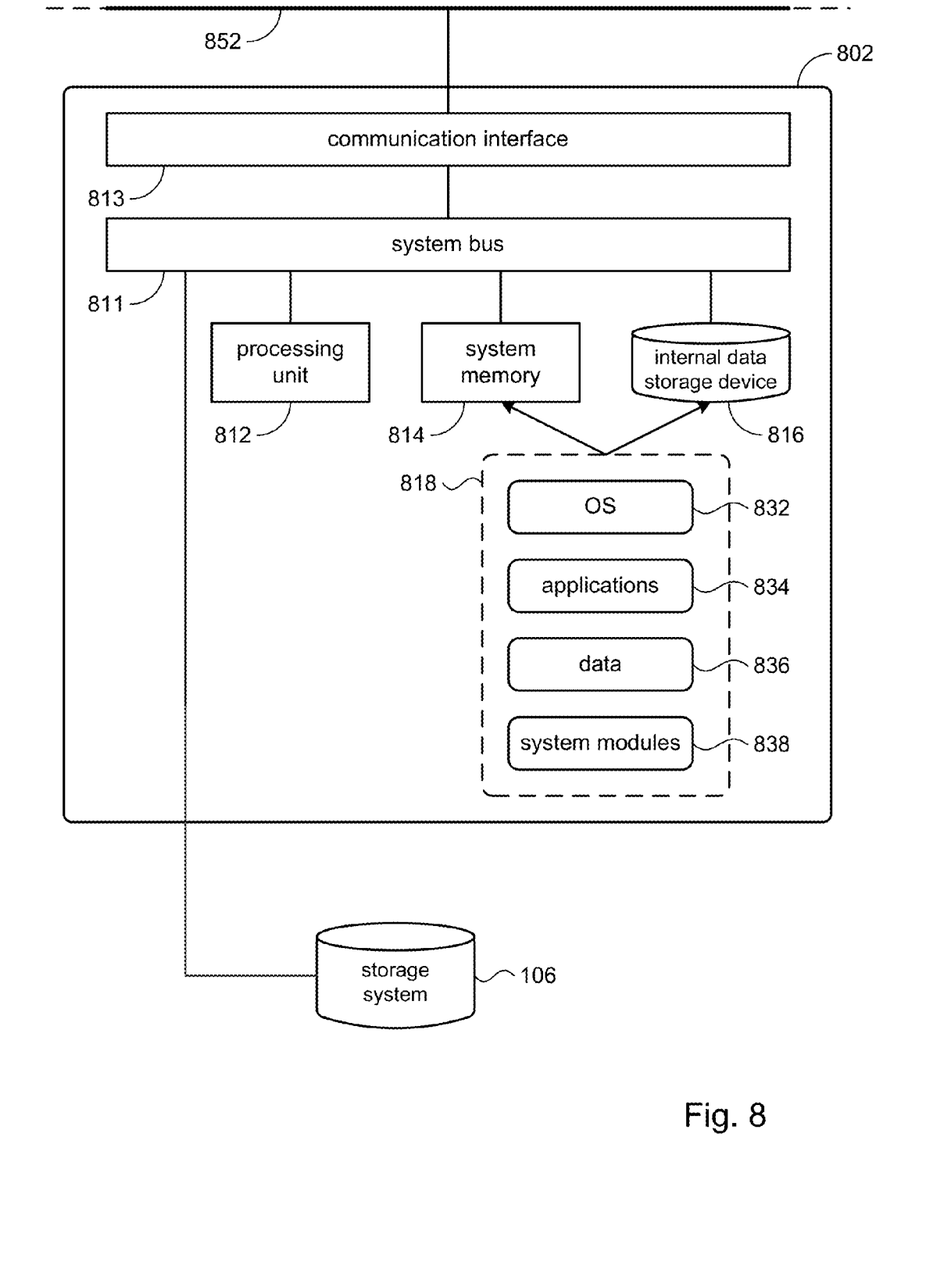
FIG. 8 shows an example of a computer configured in accordance of aspects of the present disclosure.

Referring to FIG. 8, an illustrative implementation of a computing system (e.g., 102, FIG. 1) in accordance with the present disclosure may be computer system 802, comprising a processing unit 812, a system memory 814, and a system bus 811. The system bus 811 may connect various system components including, but not limited to, the processing unit 812, the system memory 814, an internal data storage device 816, and a communication interface 813.

The processing unit 812 may comprise a single-processor configuration, or may be a multi-processor architecture. The system memory 814 may include read-only memory (ROM) and random access memory (RAM). The internal data storage device 816 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 816 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 814 and/or the internal data storage device 816 may store a number of program modules 818, including an operating system 832, one or more application programs 834, program data 836, and other program/system modules 838. For example, the application programs 834, which when executed, may cause the computer system 802 to perform method steps in FIGS. 4, 5, and 6.

The computer system 802 may operate in a networked environment using logical connections via wired and/or wireless communications to one or more remote computers (not shown) over a communication network 852. The communication network 852 may be a local area network (LAN) and/or larger networks, such as a wide area network (WAN).

ADVANTAGES AND TECHNICAL EFFECT

An event server (e.g., 244, FIG. 2) in a computing center (e.g., 200, FIG. 2) in accordance with the present disclosure offers several advantages and technical effects. For instance, a given customer of the computing center will not be able to slow down other customers because tasks of each customer are stored in an processed from respective customers' event queues. The cost of operating the computing center is not significantly increased because new customers do not require new event servers. Customers may be separated from each other, thus allowing prioritization for separate customers.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a computing center comprising:
   allocating computing resources of the computing center as services to a plurality of customers of the computing center, wherein each customer is allocated computing resources of the computing center that is allocated only to that customer, wherein each customer comprises a plurality of users who use the computing resources of the computing center allocated to that customer, wherein the computing resources of the computing center include processing capability, networking, and storage; and providing users of a customer access to computing resources allocated to the customer, including:
    allocating, from storage in the computing center, a plurality of event queues to a plurality of respective customers of the computing center;
    associating a plurality of event processors corresponding to the plurality of event queues;
    receiving events from users of the computing center to be processed in the computing center;
    for each received event sent by a user:
        identifying a customer, from among the plurality of customers, that the user is associated with;
        identifying the event queue among the plurality of event queues that is associated with the identified customer; and
        enqueuing the received event in the identified event queue; and
    for each event queue in the plurality of event queues:
        dequeuing an event from the event queue;
        sending the dequeued event to an event processor in the computing center that is associated with the event queue to be processed by the event processor; and
        processing the dequeued event using computing resources of the computing center allocated to the customer that is associated with the user.

2. The method of claim 1, further comprising concurrently dequeuing events from the plurality of event queues.

3. The method of claim 1, wherein each event queue in the plurality of event queues is associated with a priority, the method further comprising dequeuing events from the plurality of event queues in order of the priorities associated with the plurality of event queues.

4. The method of claim 1, further comprising dequeuing events from an event queue in first-in first-out fashion.

5. The method of claim 1, wherein each event in an event queue is associated with a priority, the method further comprising dequeuing events from an event queue in order of the priorities associated with the events.

6. The method of claim 1, further comprising adding a new customer to the computing center, including: creating an event queue that is associated with the new customer and adding the created event queue to the plurality of event queues.

7. The method of claim 1, further comprising receiving a request to delete an existing customer from the computing center, and in response thereto, removing from the plurality of event queues an event queue that is associated with the existing customer.

8. A computing center comprising a plurality of computer processors, the computer processors configured to:
    allocate computing resources of the computing center as services to a plurality of customers of the computing center, wherein each customer is allocated computing resources of the computing center that is allocated only to that customer, wherein each customer comprises a plurality of users who use the computing resources of the computing center allocated to that customer, wherein the computing resources of the computing center include processing capability, networking, and storage, and provide users of a customer access to computing resources allocated to the customer, including:
    allocate, from storage in the computing center, a plurality of event queues to a plurality of respective customers of the computing center;
    associate a plurality of event processors corresponding to the plurality of event queues;
    receive events from users of the computing center to be processed in the computing center;
    for each received event sent by a sent by a user:
        identify a customer, from among the plurality of customers, that the user is associated with;
        identify the event queue among the plurality of event queues that is associated with the identified customer; and
        enqueue the received event in the identified event queue; and
    for each event queue in the plurality of event queues:
        dequeue an event from the event queue;
        send the dequeued event to an event processor in the computing center that is associated with the event queue to be processed by the event processor; and
        processing the dequeued event using computing resources of the computing center allocated to the customer that is associated with the user.

9. The computing center of claim 8, wherein the computer processors are further configured to concurrently dequeue events from the plurality of event queues.

10. The computing center of claim 8, wherein the computer processors are further configured to dequeue events from an event queue in first-in first-out fashion.

11. The computing center of claim 8, wherein each event in an event queue is associated with a priority, the computer processors further configured to dequeue events from an event queue in order of the priorities associated with the events.

12. The computing center of claim 8, wherein the computer processors are further configured to add a new customer to the computing center, including: creating an event queue that is associated with the new customer and adding the created event queue to the plurality of event queues.

13. The computing center of claim 8, wherein the computer processors are further configured to receive a request to delete an existing customer from the computing center, and in response thereto, remove from the plurality of event queues an event queue that is associated with the existing customer.

14. The computing center of claim 8, wherein the computing center is a cloud data center.

15. Non-transitory computer readable media in a computing center having executable computer instructions stored thereon, which when executed by a computer system that comprises the computing center, cause the computer system to:
    allocate computing resources of the computing center as services to a plurality of customers of the computing center, wherein each customer is allocated computing resources of the computing center that is allocated only to that customer, wherein each customer comprises a plurality of users who use the computing resources of the computing center allocated to that customer, wherein the computing resources of the computing center include processing capability, networking, and storage; and provide user of a customer access to computing resources allocated to the customer including:
  allocate, from storage in the computing center, a plurality of event queues to a plurality of respective customer of the computing center;
  associate a plurality of event processors corresponding to the plurality of event queues;
  receive events from users of the computing center to be processed in the computing center;
  for each received event sent by a user:
    identify a customer, from among the plurality of customers, that the user is associated with;
    identify the event queue among the plurality of event queues that is associated with the identified customer; and
    enqueue the received event in the identified event queue; and
  for each event queue in the plurality of event queues:
    dequeue an event from the event queue;
    send the dequeued event to an event processor in the computing center that is associated with the event queue to be processed by the event processor; and
    process the dequeued event using computing resources of the computing center allocated to the customer that is associated with the user.

16. The non-transitory computer readable media of claim 15, wherein the executable computer instructions, which when executed by the computer system, further cause the computer system to concurrently dequeue events from the plurality of event queues.

17. The non-transitory computer readable media of claim 15, wherein each event queue in the plurality of event queues is associated with a priority, wherein the executable computer instructions, which when executed by the computer system, further cause the computer system to dequeue events from the plurality of event queues in order of the priorities associated with the plurality of event queues.

18. The non-transitory computer readable media of claim 15, wherein each event in an event queue is associated with a priority, wherein the executable computer instructions, which when executed by the computer system, further cause the computer system to dequeue events from an event queue in order of the priorities associated with the events.

19. The non-transitory computer readable media of claim 15, wherein the executable computer instructions, which when executed by the computer system, further cause the computer system to add a new customer to the computing center, including: creating an event queue that is associated with the new customer and adding the created event queue to the plurality of event queues.

20. The non-transitory computer readable media of claim 15, wherein the executable computer instructions, which when executed by the computer system, further cause the computer system to receive a request to delete an existing customer from the computing center, and in response thereto, remove from the plurality of event queues an event queue that is associated with the existing customer.

* * * * *